United States Patent
Wu

(10) Patent No.: US 11,500,504 B1
(45) Date of Patent: Nov. 15, 2022

(54) TOUCH CONTROLLING MECHANISM CAPABLE OF CALIBRATING VARIATIONS OF SENSOR CELLS OF TOUCH SENSOR ARRAY

(71) Applicant: PixArt Imaging Inc., Hsin-Chu (TW)

(72) Inventor: Sung-Han Wu, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

(21) Appl. No.: 17/349,884

(22) Filed: Jun. 16, 2021

(51) Int. Cl.
*G06F 3/044* (2006.01)
*G06F 3/041* (2006.01)

(52) U.S. Cl.
CPC .......... *G06F 3/0447* (2019.05); *G06F 3/0416* (2013.01); *G06F 3/0443* (2019.05)

(58) Field of Classification Search
None
See application file for complete search history.

(56) References Cited

U.S. PATENT DOCUMENTS

| | | | |
|---|---|---|---|
| 11,226,705 B2 * | 1/2022 | Wu | G06F 3/04182 |
| 2021/0293648 A1 * | 9/2021 | Tu | G01L 1/255 |

\* cited by examiner

*Primary Examiner* — Stephen T. Reed
(74) *Attorney, Agent, or Firm* — Winston Hsu

(57) ABSTRACT

A touch controlling apparatus to be coupled to a touch sensor array is disclosed. The apparatus comprises a memory circuit and a controlling circuit. The memory circuit is used for recording different calibration ratios associated with different process variations. The controlling circuit is coupled to the memory circuit, and is used for calibrating or adjusting sensitivities of a plurality of cells by respectively using the different calibration ratios to calibrate or adjust sensed capacitance changes of the plurality of cells to generate and output resultant capacitance changes of the plurality of cells.

10 Claims, 3 Drawing Sheets

TOUCH CONTROLLING MECHANISM CAPABLE OF CALIBRATING VARIATIONS OF SENSOR CELLS OF TOUCH SENSOR ARRAY

BACKGROUND OF THE INVENTION

1. Field of the Invention

The invention relates to a touch control mechanism, and more particularly to a touch controlling apparatus.

2. Description of the Prior Art

Generally speaking, a conventional touch sensing circuit, coupled to a touch sensor matrix, may employ the self-capacitive or mutual-capacitive sensing mechanism to sense the capacitance change amount of a sensor cell and then report the sensed capacitance change amount to a post-stage circuit to estimate navigation data. However, even though a user's finger navigation behavior is identical, the sensed capacitance change amounts of different sensor cells will be significant different due to the different process variations and/or the other variation factors. This inevitably causes that the accuracy performance of the estimated navigation data is significantly degraded.

SUMMARY OF THE INVENTION

Therefore one of the objectives of the invention is to provide touch controlling apparatuses, to solve the above-mentioned problems.

According to embodiments of the invention, a touch controlling apparatus to be coupled to a touch sensor array is disclosed. The touch controlling apparatus comprises a memory circuit and a controlling circuit. The memory circuit is used recording a first calibration ratio and a second calibration ratio different from the first calibration ratio. The controlling circuit is coupled to the memory circuit, and is used for using the first calibration ratio and the second calibration ratio to respectively calibrate or adjust a sensed capacitance change of a first cell in the touch sensor array and a sensed capacitance change of a second cell in the touch sensor array to generate and output a resultant capacitance change of the first cell and a resultant capacitance change of the second cell.

According to the embodiments, the recorded different calibration ratios are associated with different process variations. The controlling circuit is arranged for calibrating or adjusting sensitivities of the plurality of cells by respectively using the different calibration ratios to calibrate or adjust sensed capacitance changes of the plurality of cells to generate and output resultant capacitance changes of the plurality of cells.

According to the embodiments, a method of a touch controlling apparatus to be coupled to a touch sensor array is disclosed. The touch sensor array comprises a plurality cells each connected to a corresponding sense line and a corresponding drive line. The method comprises: providing a memory circuit to record different calibration ratios associated with different process variations; and, calibrating sensitivities of the plurality of cells by respectively using the different calibration ratios to calibrate or adjust sensed capacitance changes of the plurality of cells to generate and output resultant capacitance changes of the plurality of cells.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
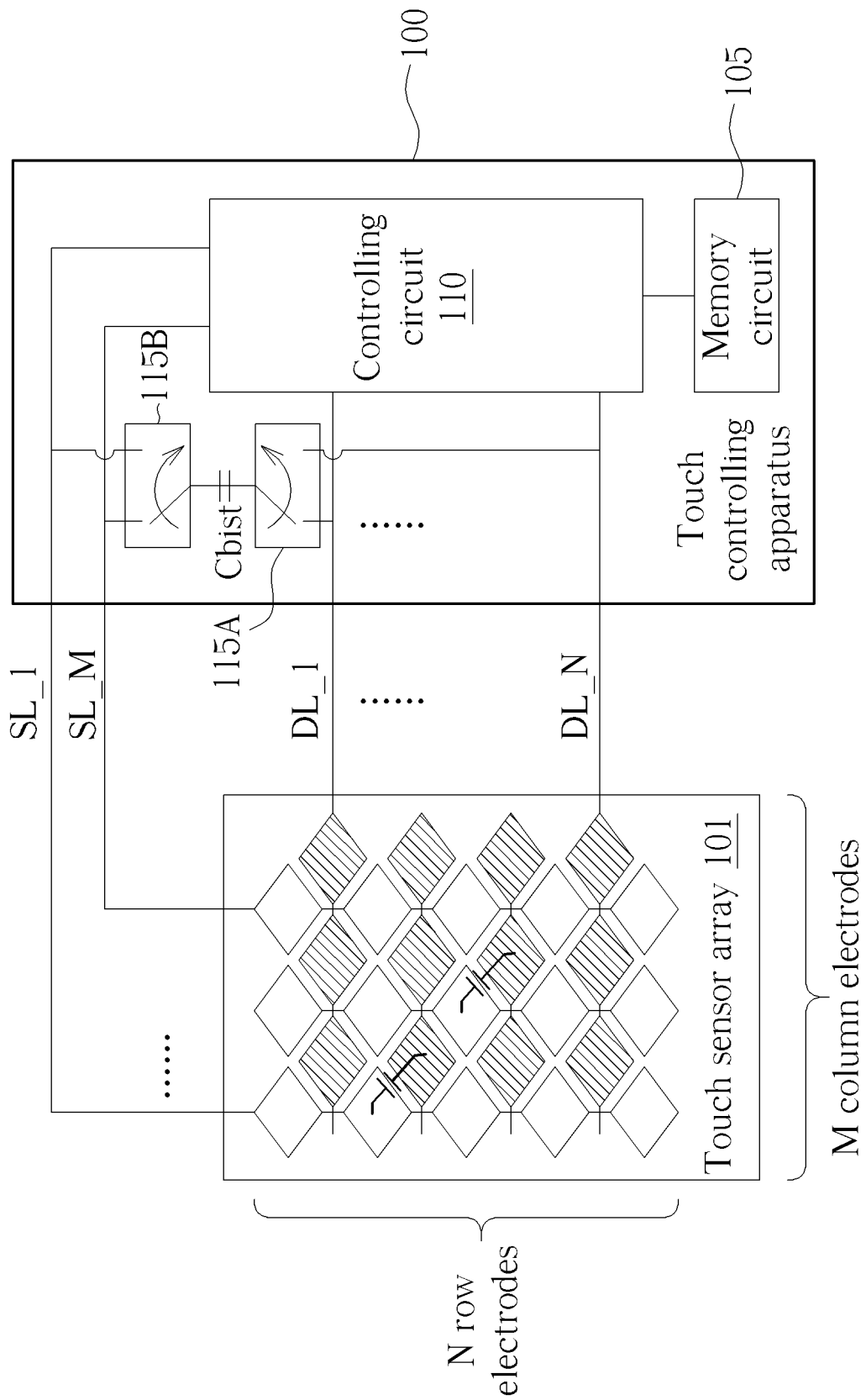
FIG. 1 is a block diagram of a touch controlling apparatus which is used to be coupled to a touch sensor array according to an embodiment of the invention.

FIG. 1 is a block diagram of a touch controlling apparatus 100 which is used to be coupled to a touch sensor array 101 according to an embodiment of the invention. As shown in FIG. 1, the touch sensor array 101 is for example a capacitive touch sensor array which comprises a capacitive touch matrix consisting of N row conductive materials such as row electrodes and M column conductive materials such as column electrodes wherein the electrodes are respectively indicated by lines with diamond-shape blocks as shown in FIG. 1. However, this is not meant to be a limitation. The row electrodes and the column electrodes may be separated by a non-conductive dielectric such as glass. The row electrodes and column electrodes are layered and form multiple nodes (intersections) each forming a tiny capacitor unit (also referred to as a sensor cell or a cell) which can used to hold some charge. When a conductive object (or a finger) approaches or touches a cell, the charge of the cell will be changed and can be measured as a drop/change in capacitance. Also, it should be noted that the values N and M may be identical or may be different in different embodiments.

The touch controlling apparatus 100 comprises a memory circuit 105, a controlling circuit 110, two switch circuits 115A and 115B, and a specific capacitor having a reference capacitance Cbist such as a built-in capacitor (but not limited). The touch controlling apparatus 100 is a touch sensing circuit, and it is coupled to the touch sensor array 101 through drive lines DL_1-DL_N (respectively be coupled to N row electrodes) and sense lines SL_1-SL_M (respectively be coupled to M column electrodes). However, this is not meant to be a limitation. In another embodiment, the touch controlling apparatus 100 may be coupled to the touch sensor array 101 through drive lines (respectively be coupled to column electrodes) and sense lines (respectively be coupled to row electrodes). The controlling circuit 110 supports the mutual-capacitance sensing mechanism, and may also support the self-capacitance sensing mechanism. The controlling circuit 110 is used for transmitting one or more drive signals such as charge pulses to the touch sensor array 101 through the drive lines DL_1-DL_N and it is used for receiving one or more sensed signals from the touch sensor array 101 through the sense lines SL_1-SL_M. The sensed signal(s) indicates charge change(s) and can be measured by the controlling circuit 110 to generate corresponding capacitance change(s), i.e. capacitance change amount(s).

The memory circuit 105 is arranged for recording or storing different calibration ratios for different cells comprised in the touch sensor array 101, e.g. a first calibration ratio and a second calibration ratio respectively used for a first cell and a second cell comprised in the touch sensor array 101. The value of second calibration ratio is different from that of the first calibration ratio, and the values of first and second calibration ratios are respectively associated with the different process variations of the first and second cells or other factors. It should be noted that, the process variations of sensor cells may cause non-consistent sensitivity to degrade the performance of accuracy. For instance (not limited), significant process variations may happen at the sensor cells at corners of a touch sensor array. The other factors may for example indicate the printed circuit board (PCB) variations.

Figure 2:
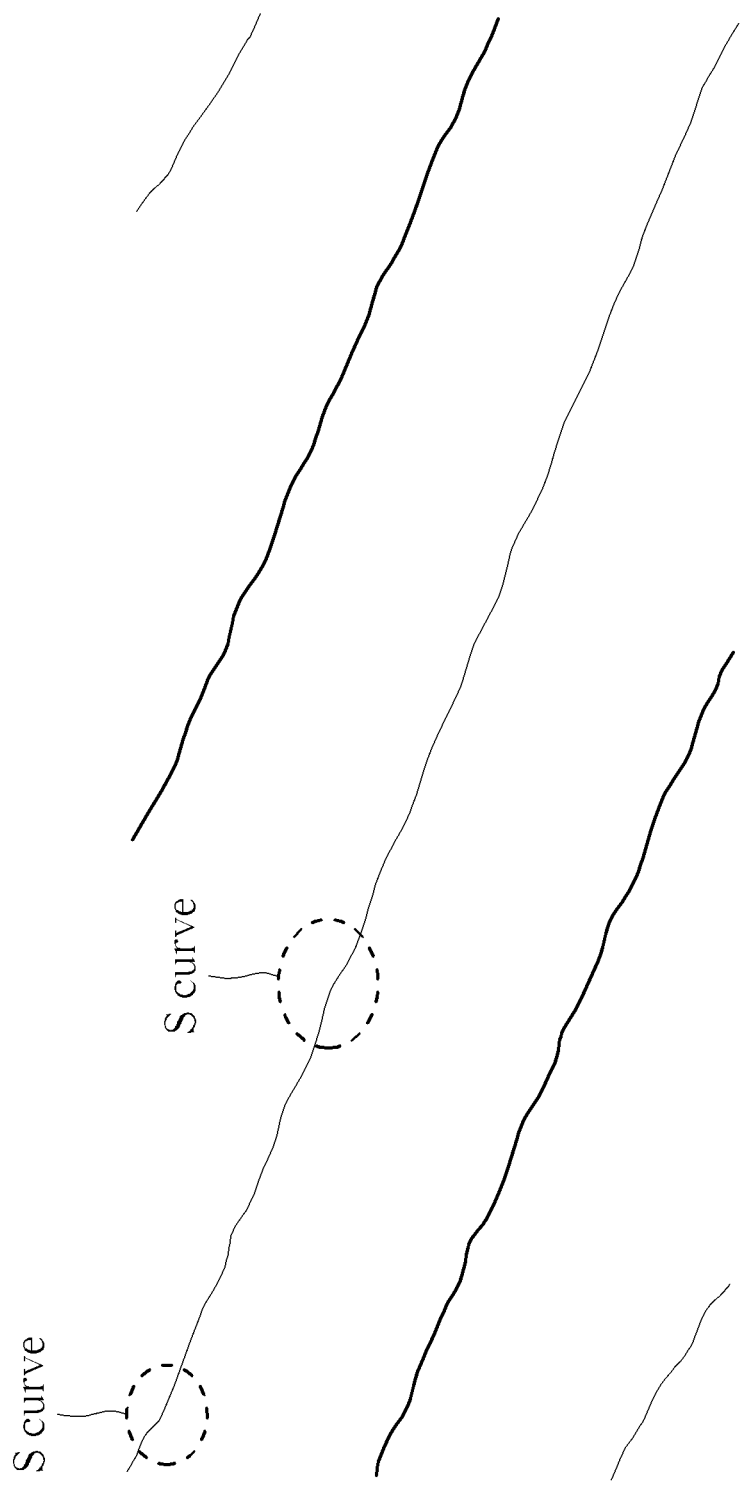
FIG. 2 illustrates a slow finger navigation example without using the disclosed calibration mechanism to reduce the effect of process variations.

The controlling circuit is coupled to the memory circuit 105, and it is used for using the different calibration ratios to respectively calibrate sensed capacitance changes (i.e. change amounts) of the different cells in the touch sensor array 101 so as to generate and output resultant capacitance change amounts of the different cells wherein the resultant capacitance change amounts of the different cells can truly or actually indicate/reflect the touch sensing amounts without being affected by the different process variations of the different cells. For instance, the controlling circuit 110 may use the first calibration ratio and the second calibration ratio to respectively calibrate or adjust a sensed capacitance change of the first cell in the touch sensor array 101 and a sensed capacitance change of the second cell in the touch sensor array 101 to generate and output a resultant capacitance change of the first cell and a resultant capacitance change of the second cell. Then, the controlling circuit 110 can use the resultant capacitance changes (change amounts) as raw touch sensing data and report the raw touch sensing data to a post-stage circuit (not shown in FIG. 1) which for examples estimates the navigation curve of a finger, so that the performance of the post-stage circuit can become more accurate since the effect of different process variations can be reduced. For instance, FIG. 2 illustrates a slow finger navigation example without using the disclosed calibration mechanism to reduce the effect of process variations. As shown in FIG. 2, the undesired S curves happen in a straight and slow finger navigation example due to the process variations of the different cells. Using the disclosed calibration mechanism can significantly reduce the undesired S curves to generate a smooth and straight slow finger navigation.

Further, the switch circuit 115A is controlled by the controlling circuit 110 to make one terminal of the specific capacitor Cbist be connected to a selected drive line or be disconnected from all drive lines. Similarly, the switch circuit 115B is also controlled by the controlling circuit 110 to make the other terminal of the specific capacitor Cbist be connected to a selected sense line or be disconnected from all sense lines.

In one embodiment, the controlling circuit 110 can be arranged to use the specific capacitor and the two switch circuits 115A and 115B to sequentially perform an open-short circuit test operation upon each cell so as to generate the corresponding calibration ratio for the each cell. For each cell, the open-short circuit test operation comprises two steps. In the open circuit step, for example, the controlling circuit 110 may control the specific capacitor be disconnected to the capacitance of a cell which may correspond to a specific drive line (e.g. DL_1, but not limited) and a specific sense line (e.g. SL_1, but not limited). In this situation, the controlling circuit 110 can measure/generate a first test capacitance change value/amount without controlling the specific capacitor being connected to the cell. Then, in the short circuit step, the controlling circuit 110 controls the specific capacitor be connected/coupled to the capacitance of the cell in parallel. In this situation, the controlling circuit 110 can measure/generate a second test capacitance change value/amount with controlling the specific capacitor being connected to the cell in parallel. Then, the controlling circuit 110 determines a calibration ratio of such cell based on the first test capacitance change value/amount and the second test capacitance change value/amount wherein the first test capacitance change value/amount is not associated with the reference capacitance of the specific capacitor Cbist while the second test capacitance change value/amount is associated with the reference capacitance of the specific capacitor Cbist. The open-short circuit test operation can be sequentially performed for each cell to generate the different calibration ratios of the different cells if the different cells are manufactured due to process variations.

Figure 3:
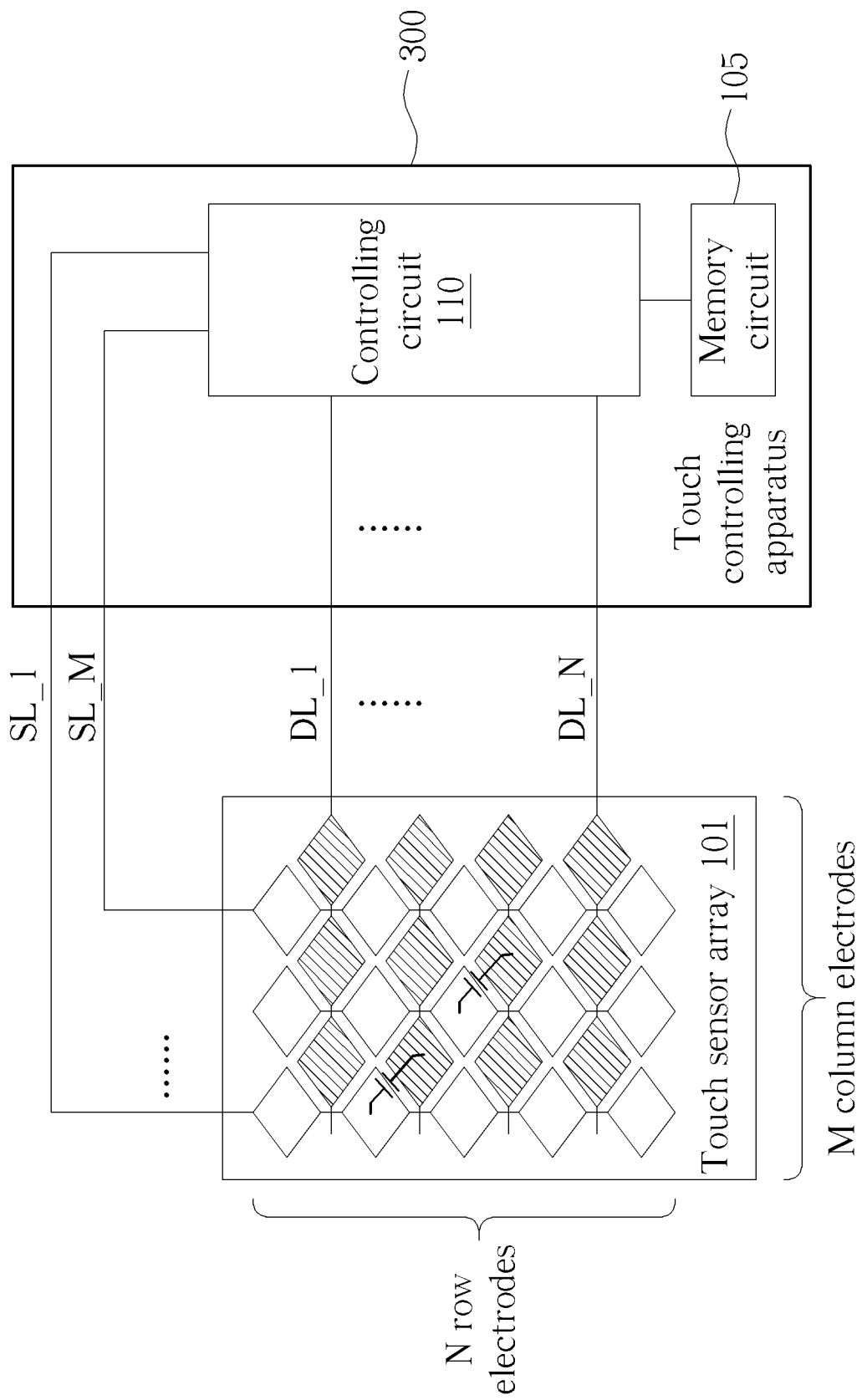
FIG. 3 is a diagram of a touch controlling apparatus which is used to be coupled to a touch sensor array 101 according to another embodiment of the invention.

Further, in one embodiment, the two switch circuits 115A and 115B and the specific capacitor Cbist may be excluded from a touch controlling apparatus if the calibration ratios of all cells can be pre-stored in the memory circuit 105. FIG. 3 is a diagram of a touch controlling apparatus 300 which is used to be coupled to a touch sensor array 101 according to another embodiment of the invention. As shown in FIG. 3, the touch controlling apparatus 300 can use one or more calibration ratios, pre-stored in the memory circuit 105, to calibrate or adjust the sensed capacitance change(s) (or change amount(s)) of one or more cells in the touch sensor array 101.

To summarize, the disclosed calibration mechanism is for example arranged to save open-short circuit test data in a memory circuit such as a nonvolatile memory, use the stored open-short circuit test data to calibrate the sensed raw data intensity such as capacitance change amount to generate resultant data intensity as the output raw data, so as to correct and improve the touch sensing accuracy as well as calibrate or adjust the non-consistent sensitivities of the cells. The open-short circuit test data can be pre-tested and pre-stored in the memory circuit. Alternatively, the open-short circuit test data can be generated when the disclosed touch controlling apparatus is powered on by a user.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A touch controlling apparatus to be coupled to a touch sensor array, and the touch controlling apparatus comprises:
   a memory circuit, recording a first calibration ratio and a second calibration ratio different from the first calibration ratio;
   a controlling circuit, coupled to the memory circuit, for using the first calibration ratio and the second calibration ratio to respectively calibrate or adjust a sensed capacitance change of a first cell comprised in the touch sensor array and a sensed capacitance change of a second cell comprised in the touch sensor array to generate and output a resultant capacitance change of the first cell and a resultant capacitance change of the second cell; the first cell and the second cell are different sensor cells comprised in the touch sensor array which comprises a plurality of different sensor cells; one of the first cell and the second cell is at a corner of the sensor array while the other of the first cell and the second cell is not at the corner of the sensor array.

2. The touch controlling apparatus of claim 1, wherein the first calibration ratio and the second calibration ratio are respectively associated with a process variation of the first cell and a process variation of the second cell.

3. The touch controlling apparatus of claim 1, further comprising:
a specific capacitor, providing a specific capacitance as a reference capacitance;
a first switch circuit, coupled to a first terminal of the specific capacitor and selectively coupled to a drive line of the touch sensor array; and
a second switch circuit, coupled to a second terminal of the specific capacitor and selectively coupled to a sense line of the touch sensor array;
wherein before generating the sensed capacitance change of the first cell, the controlling circuit is arranged for generating a first test capacitance change value by controlling the specific capacitor be disconnected from the first cell to sense the first cell through a first drive line and a first sense line, and then the controlling circuit is arranged for generating a second test capacitance change value by controlling the specific capacitor be connected to the first cell in parallel to sense the first cell through the first drive line and the first sense line; the first calibration ratio is determined based on the first test value and the second test value which is associated with the reference capacitance.

4. The touch controlling apparatus of claim 3, wherein before generating the sensed capacitance change of the second cell, the controlling circuit is arranged for generating a third test capacitance change value by controlling the specific capacitor be disconnected from to the second cell to sense the second cell through a second drive line and a second sense line, and then the controlling circuit is arranged for generating a fourth test capacitance change value by controlling the specific capacitor be connected to the second cell in parallel to sense the second cell through the second drive line and the second sense line; the second calibration ratio is determined based on the third test capacitance change value and the fourth test capacitance change value which is associated with the reference capacitance.

5. A touch controlling apparatus to be coupled to a touch sensor array, the touch sensor array comprising a plurality cells each connected to a corresponding sense line and a corresponding drive line, and the touch controlling apparatus comprises:
a memory circuit, recording different calibration ratios associated with different process variations;
a controlling circuit, coupled to the memory circuit, for calibrating or adjusting sensitivities of the plurality of cells by respectively using the different calibration ratios to calibrate or adjust sensed capacitance changes of the plurality of cells to generate and output resultant capacitance changes of the plurality of cells; the plurality of cells are different sensor cells comprised in the touch sensor array; one of the plurality of cells is at a corner of the sensor array while a different one of the plurality of cells is not at the corner of the sensor array.

6. A method of a touch controlling apparatus to be coupled to a touch sensor array, the touch sensor array comprising a plurality cells each connected to a corresponding sense line and a corresponding drive line, and the method comprises:
providing a memory circuit to record different calibration ratios associated with different process variations; and
calibrating sensitivities of the plurality of cells by respectively using the different calibration ratios to calibrate or adjust sensed capacitance changes of the plurality of cells to generate and output resultant capacitance changes of the plurality of cells; the plurality of cells are different sensor cells comprised in the touch sensor array; one of the plurality of cells is at a corner of the sensor array while a different one of the plurality of cells is not at the corner of the sensor array.

7. The method of claim 6, further comprising:
using the memory circuit to record a first calibration ratio and a second calibration ratio different from the first calibration ratio; and
using the first calibration ratio and the second calibration ratio to respectively calibrate or adjust a sensed capacitance change of a first cell in the touch sensor array and a sensed capacitance change of a second cell in the touch sensor array to generate and output a resultant capacitance change of the first cell and a resultant capacitance change of the second cell.

8. The method of claim 7, wherein the first calibration ratio and the second calibration ratio are respectively associated with a process variation of the first cell and a process variation of the second cell.

9. The method of claim 7, further comprising:
providing a specific capacitor having a specific capacitance as a reference capacitance;
providing a first switch circuit coupled to a first terminal of the specific capacitor and selectively coupled to a drive line of the touch sensor array;
providing a second switch circuit coupled to a second terminal of the specific capacitor and selectively coupled to a sense line of the touch sensor array; and
before generating the sensed capacitance change of the first cell:
generating a first test capacitance change value by controlling the specific capacitor be disconnected from the first cell to sense the first cell through a first drive line and a first sense line;
generating a second test capacitance change value by controlling the specific capacitor be connected to the first cell in parallel to sense the first cell through the first drive line and the first sense line; and
determining the first calibration ratio based on the first test value and the second test value which is associated with the reference capacitance.

10. The method of claim 9, further comprising:
before generating the sensed capacitance change of the second cell:
generating a third test capacitance change value by controlling the specific capacitor be disconnected from to the second cell to sense the second cell through a second drive line and a second sense line;
generating a fourth test capacitance change value by controlling the specific capacitor be connected to the second cell in parallel to sense the second cell through the second drive line and the second sense line; and
determining the second calibration ratio based on the third test capacitance change value and the fourth test capacitance change value which is associated with the reference capacitance.

* * * * *